Oct. 11, 1949.  L. D. DRUGMAND  2,484,155
ARC WELDING WITH CONTROLLED CURRENT PULSES
Filed March 27, 1948

Inventor
Lester D. Drugmand
By Frank H. Hubbard
Attorney

Patented Oct. 11, 1949

2,484,155

UNITED STATES PATENT OFFICE 2,484,155

ARC WELDING WITH CONTROLLED CURRENT PULSES

Lester D. Drugmand, Greenfield, Wis., assignor to Cutler-Hammer, Inc., Milwaukee, Wis., a corporation of Delaware Application March 27, 1948, Serial No. 17,455

9 Claims. (Cl. 315—237)

The invention relates to electric welding systems.

The invention is especially suitable for arc welding. In arc welding systems proposed heretofore auxiliary means had to be provided to prevent diversion of the ignition energy from the ignition circuit through the source supplying the welding arc energy, and an object of the present invention is to prevent such diversion without the employment of such auxiliary means.

Another object of the invention is to provide a welding system of the aforementioned type which is simple in construction and operation.

Another object is to provide a novel method of controlling the initiation of welding arc current supplied through various types of electronic tubes.

Another object is to provide a system which affords adjustment of the welding energy over a wide range.

Another object is to provide a common means for simultaneously rendering conducting the welding arc gap and an electron tube which controls the welding energy supplied to said arc gap.

Another object is to provide a system which affords at each operation optionally a single unidirectional welding current pulse or a plurality of such pulses.

Other objects and advantages will appear from the following description.

The appended drawing is illustrative of several embodiments of the invention. In the drawing, Figure 1 is a simplified diagram illustrating the connections of the system when using a tube having a voltage responsive ignition electrode such as disclosed in the Cox et al. Patent No. 2,445,564, issued July 20, 1948, and assigned to the assignee of the present application.

Fig. 3 illustrates an elaboration of the system illustrated in Fig. 1 when supplied with energy from an alternating source, while

Figure 1:
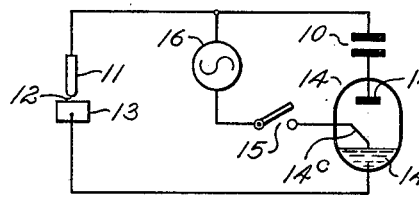

Referring to Fig. 1, one terminal of a source of welding energy, which may be a capacitor 10 of a size suitable for the work to be performed, is connected in series with a welding electrode 11 and a welding arc gap 12, to a workpiece 13, the latter constituting the second electrode of the arc gap 12. The circuit continues to the cathode 14a of an electron tube 14, provided also with an anode 14b, and a voltage responsive ignition electrode 14c. The anode 14b is connected to the second terminal of the capacitor 10. The ignition electrode 14c is connected through a control switch 15, to one terminal of a source of ignition voltage 16, while the other terminal of said source is connected to the welding electrode 11.

The operation of the system illustrated in Fig. 1 is as follows: When it is desired to make a weld, the switch 15 is closed, thereby completing a circuit from the source 16, through the switch 15, electrode 14c, cathode 14a, workpiece 13, arc gap 12, electrode 11, and back to the source 16. If the polarity and potential of the source 16 are such as to render the electrode 14c sufficiently positive relative to the cathode 14a said potential ionizes the main discharge path of tube 14 and simultaneously the arc gap 12 also. Hence a welding current is caused to flow from the capacitor 10, through the tube 14, to workpiece 13, to the welding electrode 11, and back to the capacitor 10. The current will then continue to flow as long as the voltage of the capacitor 10 is sufficiently high to overcome the impedance of the welding current circuit.

If instead of capacitor 10 the source is an alternating current source, current will flow only during those alternate half cycles when the anode 14b is positive with respect to the cathode 14a and the ignition voltage is positive with respect to the cathode during such half cycles. Current will flow during such alternate half cycles as long as switch 15 is closed to supply the aforementioned ignition voltage.

Figure 2:
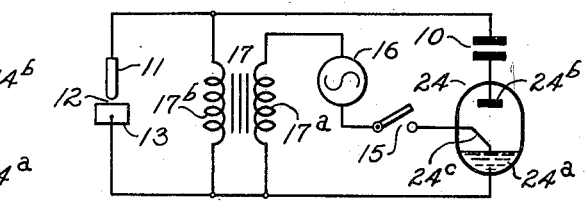
Fig. 2 is a modification of the system illustrated in Fig. 1, for use with a tube having a responsive ignition electrode such as used in the ignition type tube.

Referring now to Fig. 2, the system illustrated thereby differs from the system just described in that the tube 24 is of the aforementioned ignition type and has an ignition electrode 24c which is current-responsive, i. e. requires that a current of a certain minimum magnitude be passed therethrough to initiate the main discharge of the tube. A circuit including in series with the source 16 of ignition potential the primary winding 17a of a transformer 17 is effective upon closure of switch 15, for supplying ignition current to the electrode 24c. The ignition current impulse flowing in the primary winding 17a induces a high voltage in the secondary winding 17b, which voltage is impressed upon the arc gap 12 to ionize the same, whereupon welding current flows from the capacitor 10, through the tube 24 and across the arc gap 12, back to the capacitor, until the voltage of the capacitor is insufficient to maintain the arc any longer.

The arc energy of a single operation of the systems of Figs. 1 and 2 may be controlled by varying the energy stored in the capacitor 10.

Figure 3:
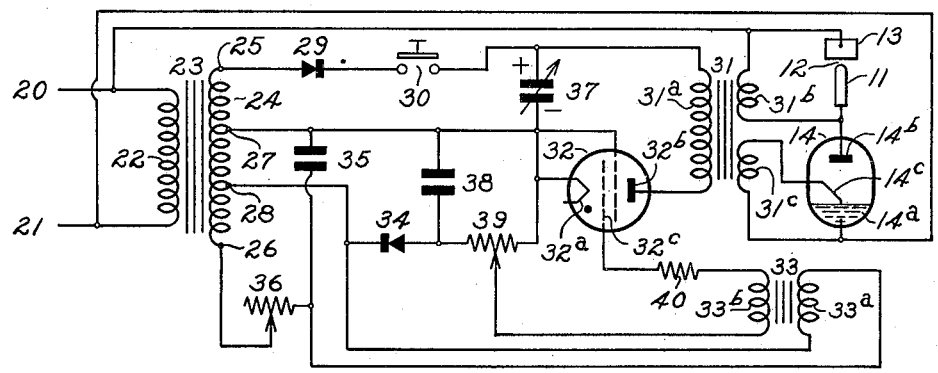

Referring to Fig. 3, alternating current supply lines 20, 21 are connected to the primary winding 22 of a transformer 23, which has also a secondary winding 24, provided with end terminals 25 and 26, and with intermediate terminals 27 and 28, the potential of the latter increasing progressively with respect to terminal 25. Connected to the terminal 25 and in series with a half wave rectifier 29 of any suitable type, a normally open push button switch 30, and the primary winding 31ª of a transformer 31, is the anode 32ᵇ of a gaseous electron tube 32. The tube 32 has also a cathode 32ª and a control electrode 32ᶜ. The cathode 32ª is connected to the terminal 27. The transformer 31 has a secondary winding 31ᵇ and another secondary winding 31ᶜ.

The secondary winding 33ᵇ of a peaking transformer 33 has one terminal connected to control electrode 32ᶜ of tube 32 in series with a current limiting resistor 40. A phase shifting network comprising a capacitor 35 and in series therewith an adjustable resistor 36 is connected between the terminals 26 and 27 of transformer 23, while the primary winding 33ª of the transformer 33 is connected between the terminal 28 of transformer 23 and the common point of resistor 36 and capacitor 35. A variable capacitor 37 is connected in series with the rectifier 29 and switch 30, between the terminals 25 and 27, and a capacitor 38 has one of its terminals connected to the terminal 27 and its other terminal connected through the rectifier 34 to the terminal 28.

Connected in parallel with the capacitor 38 is a voltage divider 39, which has an adjustable tap connected to the second terminal of the winding 33ᵇ. The secondary winding 31ᵇ is connected across the arc gap 12 between the workpiece 13 and the welding electrode 11. The workpiece is also connected to the line 20, while the electrode 11 is also connected to the anode 14ᵇ of a mercury tube 14 of the type described in the aforementioned application. The tube 14 has a mercury pool cathode 14ª and a voltage responsive ignition electrode 14ᶜ connected to one terminal of the winding 31ᶜ, while the other terminal of said winding 31ᶜ is connected jointly with the cathode 14ª and to the line 21.

The operation of the system illustrated in Fig. 3 is as follows: Let the half cycle of the alternating line voltage during which the line 21 is positive with respect to line 20 and the terminal 25 of the winding 24 is positive with respect to the terminal 26, be called the positive half cycle of the alternating voltage. With the lines 20 and 21 energized, the capacitor 38 is charged during the positive half cycle so that its voltage renders the control electrode 32ᶜ negative with respect to the cathode 32ª. The charge of the capacitor 38, which leaks off through the potentiometer resistor 39 during the intermediate negative half cycles is insignificant, so that it may be assumed that the potential of the capacitor is substantially constant. At the same time a current derived from the phase shift network 35—36 passes through the primary winding 33ª of the peaking transformer 33. The phase displacement of said current relative to the aforementioned positive half cycle is determined by the adjustment of the resistor 36 of the phase shift network 35—36. The current in winding 33ª induces a peaked alternating voltage in the winding 33ᵇ, the polarity being such that the positive peak occurs during the negative half cycle of the line voltage. This peak voltage is superposed upon the aforementioned unidirectional voltage of the capacitor 38 so that the peak of the sum of the two voltages is sufficient to afford ignition of the tube 32 when the anode 32ᵇ is positive with respect to the cathode 32ª. If now the switch 30 is closed, the capacitor 37 is substantially instantaneously charged during the positive half cycle of the alternating voltage, so that the capacitor plate which is connected to the anode 32ᵇ is positive. This charge takes place substantially at the beginning of each positive half cycle. The charged condenser 37 thus renders the anode 32ᵇ positive with respect to the cathode 32ª and at the moment of the succeeding negative half cycle determined by the setting of the phase shifting network 35—36, the tube 32 is rendered conducting to discharge the capacitor 37. The discharge current passes through the winding 31ª of transformer 31 and induces voltages in the secondary windings 31ᵇ and 31ᶜ. The former causes an ignition discharge to pass between the workpiece 13 and the electrode 11, while the latter impresses simultaneously an ignition potential between the cathode 14ª and the ignition electrode 14ᶜ, thus initiating current flow from the line 20, through the arc gap 12, and the tube 14, back to line 21. This current will cease to flow at the end of the negative half cycle. If at or before the beginning of the next succeeding positive half cycle the switch 30 has been opened, the capacitor 37 will not be charged again, it being so proportioned with respect to the impedance of the discharge circuit that it will be substantially discharged by a single pulse of current through the tube 32. If during such next succeeding positive half cycle the switch 30 is still held closed, conduction of the tube 14 and of the arc gap 12 will again be initiated in the manner aforedescribed so as to supply additional welding impulses to the arc gap 12.

It will be apparent that the moment of initiation of flow of welding energy and its effective value during a given half cycle may be determined by the adjustment of the phase shifting network, while the total number of such current pulses is regulated by the time of closure of switch 30.

Figure 4:
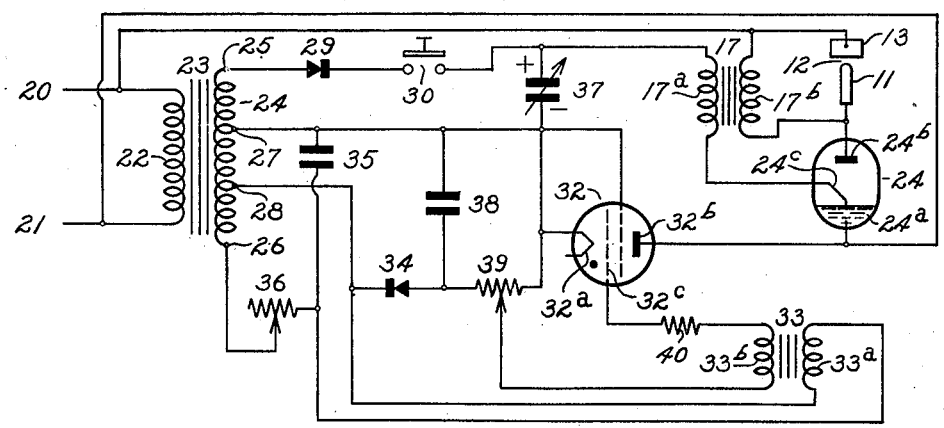
Fig. 4 is such an elaboration of the system illustrated in Fig. 2.

The system illustrated in Fig. 4 is similar to that aforedescribed in connection with Fig. 3, except as will be pointed out hereinafter. The tube 14 of Fig. 3 is replaced by an ignitron tube 24, which has a cathode 24ª, an anode 24ᵇ, and a current responsive ignition electrode 24ᶜ. The transformer 31 of Fig. 3 is replaced by a transformer 17 which has a primary winding 17ª connected between the positive terminal of capacitor 37 and the ignition electrode 24ᶜ. A secondary winding 17ᵇ of transformer 17 replaces the winding 31ᵇ of Fig. 3. The secondary winding 31ᶜ of Fig. 3 is omitted.

The system of Fig. 4 operates similarly to the aforedescribed system shown in Fig. 3, except as follows: The discharge current of capacitor 37 passes through the primary winding 17ª over the current responsive ignition electrode 24ᶜ, cathode 24ª, thence through tube 32, back to capacitor 37. This induces a voltage in the winding 17ᵇ, which produces an ignition discharge across arc gap 12. Hence the arc gap between the electrode 11 and the workpiece 13, and the tube 24 are simultaneously ionized and the welding current flows during predetermined periods through the welding arc gap, as has been explained heretofore.

The moment of starting of welding current flow during the negative half cycle of the line voltage and hence the total welding energy may be adjusted by adjusting the phase shift network 35—36 as aforedescribed in connection with Fig. 3.

As will be apparent in the systems of Figs. 3 and 4, welding current supplied by the lines 20—21 flows during a succession of negative half cycles while the switch 30 is closed.

What I claim as new and desire to secure by Letters Patent is:

1. In a welding system, the combination with a work-piece, a cooperating welding electrode, an arc gap intervening between the latter and the former, a source of welding energy and an electron tube having a main discharge path and a control electrode, of connections to provide a first circuit including in series with each other said source, said main discharge path of said tube and said arc gap, and a second circuit for said control electrode, the cathode of said tube and said arc gap providing for ionization of said arc gap as a function of current flow between said control electrode and said cathode, and means to impress a pulse of ignition energy upon said last named circuit for initiating the flow of welding current through said first named circuit.

2. In a welding system, the combination with a work-piece, a cooperating welding electrode, an arc gap intervening between the latter and the former, a source of welding energy and an electron tube having a main discharge path and a control electrode, of a switch, a source of ignition voltage, and connections to provide a first circuit including in series with each other said source, said main discharge path of said tube and said arc gap, and a second circuit including in a functionally series relation with each other said switch, said source of ignition voltage, said ignition electrode, the cathode of said tube and said arc gap to afford simultaneous initiation of current flow through said arc gap and said tube.

3. In a welding system, the combination with a work-piece, a cooperating welding electrode, an arc gap intervening between the latter and the former, a source of welding energy and an electron tube having a main discharge path and a control electrode, of connections to provide a first circuit including in series with each other said source, said main discharge path of said tube and said arc gap, and a second circuit including in series with each other said ignition electrode, the cathode of said tube, said arc gap, a source of control voltage and a switch operable to close said second circuit for ionizing said tube and said arc gap to initiate flow of welding current through said first named circuit.

4. In a welding system, the combination with a work-piece, a cooperating welding electrode, an arc gap intervening between the latter and the former, a source of welding energy and a gaseous electron tube having a main discharge path and an ignition electrode effective to ionize said main discharge path in response to a given current supplied to said electrode, of connections to provide a first circuit including in series with each other said source, said main discharge path of said tube and said arc gap, a transformer having a primary and a secondary winding, a second circuit including in series with each other said ignition electrode, the cathode of said tube and said primary winding, and means to impress a pulse of ignition energy upon said second circuit, and a third circuit including said secondary winding and said arc gap.

5. In a welding system, the combination with a workpiece, a cooperating welding electrode, an arc gap intervening between the latter and the former, a source of welding energy and a gaseous electron tube having a main discharge path and an ignition electrode effective to ionize said main discharge path in response to a given current supplied to said electrode, of connections to provide a first circuit including in series with each other said source, said main discharge path of said tube and said arc gap, a transformer having a primary and a secondary winding, a second circuit including in series with each other said ignition electrode, the cathode of said tube, said primary winding, a source of ignition current and a switch operable to close said second circuit, and a third circuit including said secondary winding and said arc gap.

6. In a welding system, the combination with a workpiece, a cooperating welding electrode, an arc gap intervening between the latter and the former a source of welding energy and a gaseous electron tube having a main discharge path and an ignition electrode, of circuit connections including in series with each other said source, said main discharge path of said tube and said arc gap, a capacitor, means to charge said capacitor to a given potential, means to discharge said capacitor at will, and means to impress at least a part of the discharge energy of said capacitor simultaneously upon said arc gap and said ignition electrode.

7. In a welding system, the combination with a workpiece, a cooperating welding electrode, an arc gap intervening between the latter and the former, an alternating current source, a gaseous electron tube having a main discharge path and an ignition electrode, of circuit connections including in series with each other said source, said main discharge path of said tube and said arc gap, a capacitor, means including rectifying means to charge said capacitor substantially instantaneously from said source while said source has a given polarity, means operative to discharge said capacitor while said source has the opposite polarity, including means to time initiation of discharge with respect to the phase angle of the alternating current from said source, and means to impress at least a part of the discharge energy of said capacitor simultaneously upon said arc gap and said ignition electrode.

8. In a welding system, the combination with a workpiece, a cooperating welding electrode, an arc gap intervening between the latter and the former, an alternating current source, a gaseous electron tube having a main discharge path and an ignition electrode, of circuit connections to provide a first circuit including in series with each other said source, said main discharge path of said tube and said arc gap, a capacitor, means including rectifying means to charge said capacitor substantially instantaneously from said source while said source has a given polarity, a second gaseous electron tube having a control electrode and having its main discharge path connected in shunt across said capacitor, a phase shifting network connected to said source and arranged to normally impress a potential upon the control electrode of said second tube to render said tube non-conducting during half periods of one polarity of said source, means operative to vary said last named potential for rendering the tube conducting to discharge said condenser during half periods of the opposite polarity of said source and means to impress at least part of the energy of discharge of said capacitor simultaneously upon said arc gap and said ignition electrode.

9. In a welding system, the combination with a workpiece, a cooperating welding electrode, an arc gap intervening between the latter and the former, an alternating current source, a gaseous electron tube having a main discharge path and an ignition electrode, of connections to provide a first circuit including in series with each other said source, said main discharge path of said tube and said arc gap, a capacitor, means including a half wave rectifier adapted to charge said capacitor to a given potential with rectified energy from said source, a second gaseous electron tube having a control electrode and having its main discharge path connected in shunt across said capacitor, a phase shifting network connected to said source and arranged to normally impress a potential upon the control electrode of said second tube to render said tube non-conducting, means to vary said last named potential for rendering the tube conducting to discharge said condenser during the half cycles when said rectifier blocks current conduction from said source and means to impress at least part of the energy of discharge simultaneously upon said arc gap and said ignition electrode.

LESTER D. DRUGMAND.

No references cited.

Certificate of Correction

Patent No. 2,484,155                                             October 11, 1949

LESTER D. DRUGMAND

It is hereby certified that errors appear in the printed specification of the above numbered patent requiring correction as follows:

Column 1, line 42, and column 2, line 34, for the word "ignition" read *ignitron*; column 6, line 12, after "former" insert a comma;

and that the said Letters Patent should be read with these corrections therein that the same may conform to the record of the case in the Patent Office.

Signed and sealed this 31st day of January, A. D. 1950.

[SEAL]

THOMAS F. MURPHY,
*Assistant Commissioner of Patents.*